United States Patent
Hammen et al.

(10) Patent No.: US 8,709,351 B2
(45) Date of Patent: Apr. 29, 2014

(54) ATMOSPHERIC TREATER WITH ROLLER CONFINED DISCHARGE CHAMBER

(75) Inventors: Richard R. Hammen, Waupaca, WI (US); Joseph Roethle, Jackson, WI (US); Gregory W. Schuelke, Hubertus, WI (US)

(73) Assignee: Enercon Industris Corporation, Menomonee Falls, WI (US)

( * ) Notice: Subject to any disclaimer, the term of this patent is extended or adjusted under 35 U.S.C. 154(b) by 1166 days.

(21) Appl. No.: 12/255,847

(22) Filed: Oct. 22, 2008

(65) Prior Publication Data

US 2009/0120782 A1    May 14, 2009

Related U.S. Application Data

(60) Provisional application No. 60/986,319, filed on Nov. 8, 2007, provisional application No. 61/094,325, filed on Sep. 4, 2008.

(51) Int. Cl.
 *B01J 19/08* (2006.01)

(52) U.S. Cl.
 USPC ............ 422/186.04; 422/186; 422/186.05; 422/186.06; 204/164; 204/165; 250/324; 250/492.1; 8/115.52; 8/149.2; 264/423; 68/5 D; 68/5 E; 68/8; 68/97; 68/99; 226/152

(58) Field of Classification Search
 CPC ........ B29C 59/016; B29C 59/14; H01T 19/00
 USPC ............ 422/186, 186.04; 204/164, 165; 8/115.52, 149.2; 264/423; 250/324, 250/492.1; 226/152

See application file for complete search history.

(56) References Cited

U.S. PATENT DOCUMENTS

| | | | |
|---|---|---|---|
| 3,409,537 A | 11/1968 | Cannon | |
| 4,724,507 A * | 2/1988 | Ahlbrandt | ............. 361/225 |
| 5,314,539 A | 5/1994 | Brown et al. | |
| 5,456,972 A | 10/1995 | Roth et al. | |
| 5,792,517 A * | 8/1998 | Takeuchi et al. | ............. 427/444 |
| 6,054,018 A | 4/2000 | Denes et al. | |
| 6,082,292 A | 7/2000 | Denes et al. | |
| 6,083,355 A | 7/2000 | Spence | |
| 6,096,389 A | 8/2000 | Kanai | |
| 6,118,218 A * | 9/2000 | Yializis et al. | ............. 315/111.21 |
| 6,429,595 B1 | 8/2002 | Hammen et al. | |
| 2006/0016460 A1 * | 1/2006 | Cozart, Jr. | ............. 134/6 |

OTHER PUBLICATIONS

PCT/US2008/080723 International Search Report mailed on Feb. 9, 2009.

* cited by examiner

*Primary Examiner* — Xiuyu Tai
(74) *Attorney, Agent, or Firm* — Quarles & Brady LLP (57) ABSTRACT

A continuous feed discharge surface treater for treating web materials has a discharge chamber where ionization of a process gas occurs defined and contained by one or more rollers. Enhanced chemical coronas and plasmas are achieved by limiting depletion of the gas chemistry from the discharge chamber and dilution or contamination from mixing with drawn in ambient air. Atmospheric coronas can also be achieved in which minimal or no ozone is exhausted from the treater. Various roller and electrode assemblies, including both fixed and rolling electrodes, can be employed.

16 Claims, 7 Drawing Sheets

ATMOSPHERIC TREATER WITH ROLLER CONFINED DISCHARGE CHAMBER

CROSS-REFERENCE TO RELATED APPLICATIONS

This application claims benefit to U.S. provisional application Ser. Nos. 60/986,319, filed Nov. 8, 2007, and 61/094,325, filed Sep. 4, 2008.

STATEMENT OF FEDERALLY SPONSORED RESEARCH/DEVELOPMENT

Not applicable.

BACKGROUND OF THE INVENTION

The invention generally relates to systems for treating the surfaces of materials, especially continuously fed, bi-dimensional materials such as webs, sheets, films, papers, textiles, and the like to enhance the surface characteristics of the materials.

Materials, such as paper, polymer webs and various films, are often used in printing, coating and laminating applications. Many polymers, for example, have chemically inert surfaces with low surface energies providing poor bonding properties. To improve bonding, the surface of the material must be treated to raise the surface tension and thereby improve the application of adhesives and inks. There are a number of known techniques for treating the surface of materials to raise surface energy including IR, UV, x-ray and gamma ray irradiation, electron and ion beam bombardment, ozone exposure and flame, chemical, corona and plasma treatments. Furthermore, these techniques are often used to effect surface treatment in large scale operations as part of an assembly or other process line. The material is ordinarily fed at a high rate through a reactor or discharge chamber wherein the discharge and treatment occurs.

In corona treatment, the material is ordinarily fed through the discharge chamber where one surface of the material is bombarded with ions produced by a high voltage alternating electric field. The material can be supported by a backing roll, which can also serve as one electrode for the treater. An active electrode assembly can be supported in the discharge chamber and spaced from the backing roll equidistantly along its length. The active electrode may be either a single integral electrode that extends the entire width of the treater station, or it may be a set of electrode segments, which can be selectively moved into and out of a treatment position to adjust the location, and width of the discharge chamber as disclosed in U.S. Pat. No. 3,409,537. A high voltage AC power supply is connected across the backing roll and active electrodes to produce a corona through which the web passes.

Chemical corona and plasma treaters generally provide a more uniform and controllable surface treatment than corona treaters. In plasma treaters, for example, the discharge chamber is infused with an inert gas that is partially ionized by the energized electrodes. Many plasma treaters require that the pressure of the ionized gas be well below atmospheric pressure. This requires expensive and cumbersome vacuum chambers and pumps to maintain the low pressure. However, more recent treaters can form plasma at atmospheric pressure, see U.S. Pat. No. 5,456,972. In this process, the plasma would form at atmospheric pressure provided an inert gas, typically helium, was used, and a dielectric was applied between the electrodes. Provided that the operating frequency and voltage of the power source are selected to avoid the ambient air from being too readily ionized by the high frequency electric field, a plasma curtain can be formed instead of the lesser quality corona.

Regardless of the type of discharge process, for consistent, high quality treatment it is important to maintain proper conditions within the discharge chamber, which includes maintaining adequate discharge by operating the system at the necessary frequency, maintaining a proper gap distance between the electrodes, and maintaining an adequate flow of process gas throughout the discharge chamber. The latter is particularly important for chemical corona and plasma treatment in which a specific gas or gas chemistry is needed at the discharge of the electrode in order to effect the intended discharge. Maintaining the presence and quality of the gas or gas chemistry in the discharge chamber is particularly difficult for continuous line feed treatment applications because the long web of material passes through the treater at a high speed which causes a boundary layer of air on the web, which is often in a laminar state, to flow into the discharge chamber, thereby displacing and/or diluting the desired gas/gas chemistry. This can also introduce contaminants into the discharge chamber, which can have an adverse effect on the quality and consistency of the treatment, for both corona and plasma treatment. External air cooling of the electrode assembly is also problematic in this regard since the gas/gas chemistry can be inadvertently evacuated from the discharge chamber.

Considerable effort has been expended in this art to safeguard the gas and maintain specific conditions, such as pressure ranges, within the discharge chamber. Many prior art systems, particularly those for use in continuous feed applications and requiring evacuated discharge chambers, employ complex arrangements to seal off the discharge chambers from the ambient environment. For example, U.S. Pat. Nos. 5,314,539; 6,054,018; 6,082,292 and 6,083,355 all disclose systems for maintaining vacuum conditions for continuous feed plasma treaters. Sealed enclosures, vacuum pumps, vacuum lines and remote roller assemblies are used to seal off the discharge chambers. U.S. Pat. No. 5,314,539 uses a number of rollers arranged in series along an arc so that working in stages from outside in a low pressure area can be achieved and maintained between the inner two most rollers where the electrodes are located. Each of the other three patents attempts to improve upon such a multi-staged vacuum arrangement, however, all remain significantly complex to manufacture, assemble, use and maintain. For instance, both U.S. Pat. Nos. 6,054,018 and 6,083,355 require an enclosure housing the electrodes and defining the discharge chamber which has a narrow, remote access opening, through which the web material must be thread, that is sealed by a complex roller arrangement sealing against the web material. Similarly, U.S. Pat. No. 6,082,292 requires a sealed enclosure housing the electrode and defining the discharge chamber as well as two pairs of inside compliant rollers an outside non-compliant rollers to interface with the web material. In all these systems, considerable attention is also given to ensuring that the lateral ends (at each side of the web) are sufficiently sealed in order to achieve and maintain a vacuum.

Furthermore, another significant issue particular to corona treatment, which is typically operated in ambient conditions, is the need to exhaust ozone by-product resulting from the ionization of oxygen-containing air. To prevent odor and poor air quality in the area of the treater, this ozone must be carried away from the treater, possibly decomposed back into oxygen and exhausted from the building. To do this, conventional treaters are integrated with forced air exhaust systems, which often tie into facility air exchange systems to remove the ozone. In addition to the complexity and expense associated with such systems, they can disrupt conditions in the discharge chamber and further exasperate the aforementioned problem.

SUMMARY OF THE INVENTION

The present invention provides a treater system that addresses the above-mentioned concerns and facilitates the surface treatment of materials, especially continuous, bi-dimensional web and sheet materials such as films, papers, textiles and the like, using discharge processes, such as corona, chemical corona and plasma discharge.

The treater of the present invention can have a discharge chamber, where the discharge occurs, that is located between and confined by one or more rollers or belts. Various exemplary electrode and roller arrangements are described herein, including treaters with rolling or fixed electrodes, treaters in which the treatment zones are confined by the rollers sealing against themselves, the electrodes or by way of a serpentine belt as well as treaters having internal cooling and diffusers for disturbing the working media along the treatment zone. All of the designs can be operated to effect plasma discharge by selecting a specific gas or gas chemistries as the process gas, or they can be operated to effect corona discharge by ionizing air at atmospheric or other positive or negative pressures.

The material to be treated can be fed through the treater station, whereby the feed and exit sides of the discharge chambers are confined by contact of the rollers(s) or belt(s) with the material being treated. The lateral ends of the discharge chamber, where in some cases the air or gas chemistry is passed into the discharge chamber, are also confined by partially enclosing the ends so that the process chamber is largely confined in all directions, while remaining in communication with ambient air.

Confining the discharge chamber in close proximity to the discharge allows for more consistent and homogenous treatment. Inadvertent loss of the process gas is reduced or eliminated. Ambient air surrounding the treater is also essentially prevented from entering into the discharge chamber, which could otherwise displace the process gas and/or introduce airborne contaminants into the discharge chamber, which can dilute the process gas being ionized and lead to plasma streamers or other discharge anomalies, which would ultimately diminish the quality and homogeneity of the treatment. In particular, sealing the leading edge of the discharge chamber prevents the boundary layer of air at the surface of the material (typically in a laminar state) from entering the discharge chamber as the material is fed into the treater. This also allows for higher line speeds, greater throughput and significantly less gas consumption, on the order of at least 50%.

Confining, rather than completely isolating, the discharge chamber is also advantageous because high quality corona, chemical corona and plasma treatments can be achieved at atmospheric pressure without the need for an air tight enclosure and elaborate sealing means of systems requiring that a vacuum be maintained in the discharge chamber. This in turn allows for easier and quicker feeding of the material and less maintenance by reducing the turns required by the material and permitting a more direct feed path. All of this can be achieved with the present invention without sacrificing high line speeds and low consumption of the process gas.

The treater system allows for atmospheric corona and plasma treatment of the material without any significant net ozone production being exhausted from the discharge chamber. That is, despite the open discharge chamber having ozone present in high concentrations as a result of the ionization process, the exhaust from the discharge chamber is essentially ozone-free such that only trace amounts, if any, are detectable in the air surrounding the treater. More specifically, with the present invention no more than 0.1 parts per million of ozone is detectable within about one meter of the discharge chamber. In fact, empirical study has concluded that significantly less ozone concentrations are possible with the present invention, for example approximately 0.01 ppm at one meter or even lesser concentrations such that ozone is virtually undetectable with conventional equipment beyond one meter from the discharge chamber. It is believed that the ozone generated during the ionization of air within the discharge chamber is largely or entirely disassociated or broken down by thermal energy back into oxygen as a result of confining the discharge chamber. Thus, the ozone generated is not allowed to freely dissipate into the air surrounding the treater, but instead is confined within the discharge chamber where elevated temperatures from the discharge process cause the reassociation of oxygen atoms, and thus the conversion of ozone into oxygen.

Thus, surface treatment of materials can be accomplished using corona discharge, a less costly and more readily available form of discharge treatment. Furthermore, there is no need for large, cumbersome forced air exhaust systems for removing and/or decomposing ozone, which are expensive, complicated assemblies and can disrupt conditions in the discharge chamber.

Moreover, the invention provides for retrofitting existing treater stations by integrating the active electrode and confining roller assembly with existing treaters. For example, a roller electrode and pair of nip rollers can be offered as a kit assembly and installed in existing treaters to define and confine the discharge chamber between the roller electrode, nip rollers and treated material, which can be supported on a backing roll. The roller electrode and roller assembly can be pre-assembled to end mounts, such that the pre-assembly can be readily installed in a treater after modification to accept the end mounts. Other kits can be provided with different electrode and roller configurations, such as those arrangements described below, including for example assemblies with stationary active and ground electrodes and additional rollers.

The advantages of the invention will be apparent from the detailed description and drawings. What follows are one or more preferred embodiments of the present invention. To assess the full scope of the invention, the claims should be looked to as no one embodiment is intended to fully set forth the scope of the invention.

DETAILED DESCRIPTION OF THE PREFERRED EMBODIMENT(S)

Figure 6:
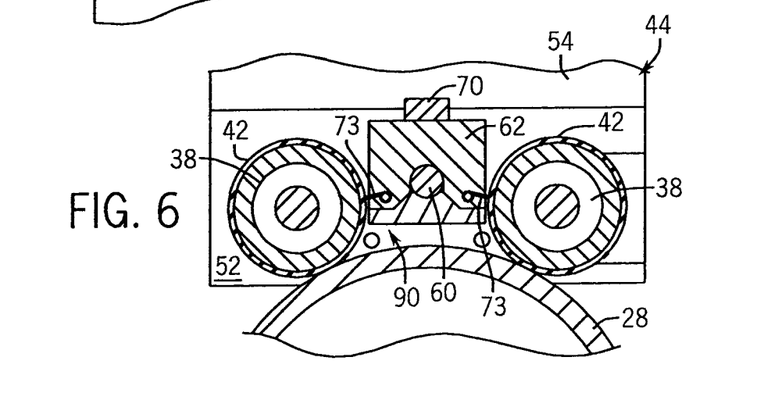
FIG. 6 is a partial sectional view thereof taken along line 6-6 of FIG. 2.
Figure 7:
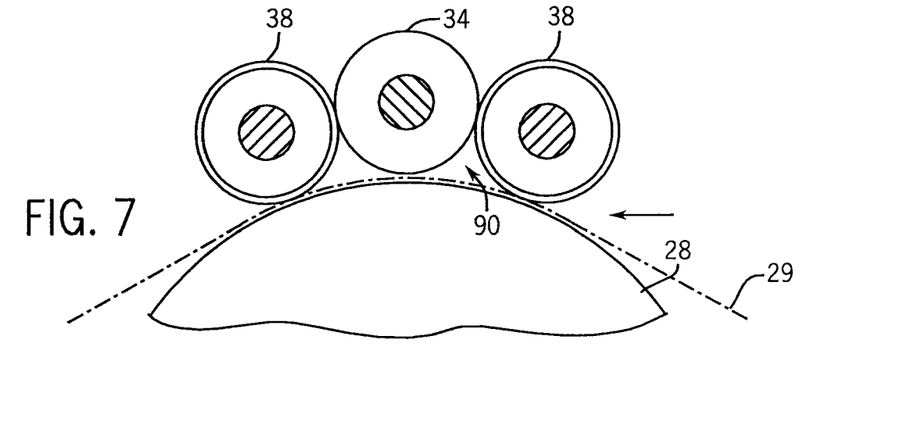
FIG. 7 is a simplified view of FIG. 6.

Referring now to the drawings, FIGS. 1-6 illustrate in detail one embodiment of a treater station 20 according to the present invention. FIG. 7 shows a simplified representation of the discharge chamber defining components of this embodiment to both aid in understanding as well as to facilitate comparison with the various other embodiments described herein. FIGS. 8-14 depict other embodiments in which the present invention can be practiced advantageously, again showing the discharge chambers in simplified form in a way similar to FIG. 7.

All of the disclosed embodiments have in common certain basic components, including a high voltage power supply, one or more electrodes, and one or more rollers. The various embodiments can also all have elongated electrodes and rollers suitable for treating the full widths of web materials in continuous, line-feed applications. Additionally, each embodiment can be operated to effect various discharge treatments, including for example, corona and plasma discharge treatments, and in particular, zero or essentially zero ozone exhaust corona treatment at atmospheric pressure. While various other embodiments are envisioned, specific embodiments may have differing types and/or quantities of electrodes and rollers or include additional features, such as electrode cooling arrangements and working media dispersion components, as will be described.

Referring to FIGS. 1-6, the treater station 20 will now be described in greater detail. In particular, the treater station 20 has a mounting frame 22 including upright supports 24 and horizontal bracing 26 at the top and bottom ends thereof. Spaced from the bottom of the treater station 20 is a backing roll 28 having a spindle 30 at both ends mounted to the upright supports 24 via journal bearings 32 (one shown) to allow for continuous free rotation with respect to the supports 24. The backing roll 28 serves to both provide the rolling support for the web material 29 (see FIG. 7) and one potential for the discharge. The backing roll 28 is a conductive cylinder, preferably made of metal such as aluminum or steel, coated with a heat resistive dielectric material layer, such as suitable ceramic.

Opposing the backing roll 28 is a roller electrode 34 which provides the other potential for the discharge. A high voltage power transformer 36 (coupled to a remote power supply and any applicable electronics not shown) has its high voltage lead electrically coupled to the roller electrode 34 and its ground lead coupled to the backing roll 28 in any suitable known manner. Like the backing roll 28, the roller electrode 34 is a conductive cylinder of suitable metal, again such as aluminum or steel. The roller electrode 34 can also have a dielectric outer layer, and it must have a dielectric if the treated material is conductive to prevent arcing from the roller electrode 34, however, that is not necessary for non-conductive materials, provided the backing roll 28 has a dielectric.

The art of discharge, including corona, chemical corona and plasma discharge, is well understood by those skilled in the art, and thus a detailed explanation of the general technology is unnecessary. Generally, however, activating or energizing the roller electrode 34 with high voltage effects a charge between the high potential roller electrode 34 and the ground potential backing roll 28, and by properly selecting certain operational parameters, such as the energization frequency and voltage, discharge will occur. Depending upon what process gas is present at the discharge (e.g., air, an inert gas such as nitrogen or helium or mixtures of an inert gas and a reactive gas such as oxygen, hydrogen and acetylene), a corona, chemical corona or plasma discharge can be achieved. For example, it is well-known that helium (even at 80 percent of the mixture) can be used to produce plasma treatment, which provides high surface energies at the surface being treated, thus raising its mean surface energy and effecting a more homogeneous surface activation as compared to corona treatment. A high frequency power supply, such as a high voltage AC power supply operable at up to 300 kHz, may be used to effect an even more homogenous surface treatment than lower frequency plasma treatment, which will provide at least corona level treatment with the enhanced uniformity of plasma treatment. However, the specific parameters and gas/gas mixture used can be selected based on the application, such as the material composition of the article being treated. U.S. Pat. No. 6,429,595, at col. 5, line 13 to col. 6, line 23, the disclosure of which is hereby incorporated by reference, provides a discussion of suitable gas chemistry and operational parameters of the type suitable for use with the present invention.

Figure 1:
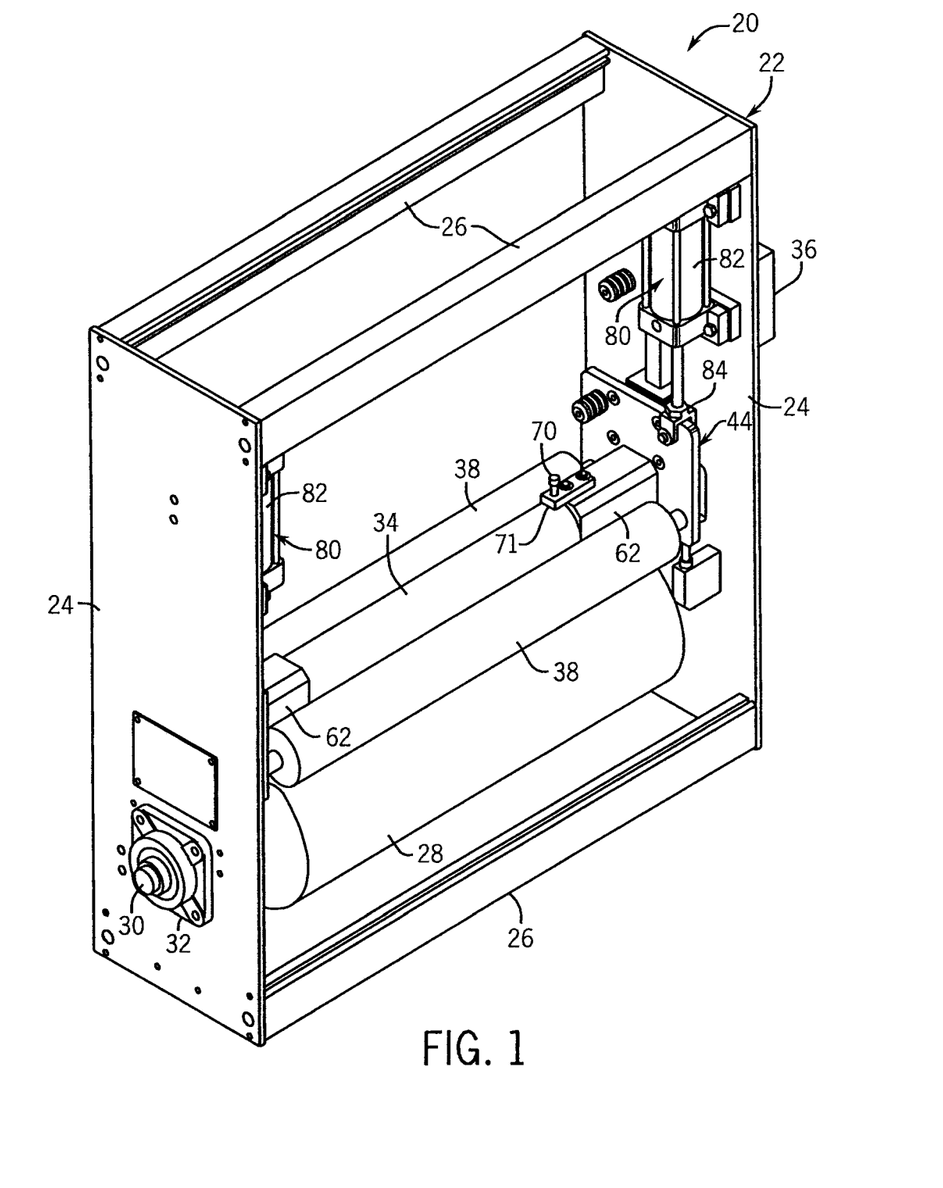
FIG. 1 is a perspective view of a treater station according to one embodiment of the present invention.
Figure 2:
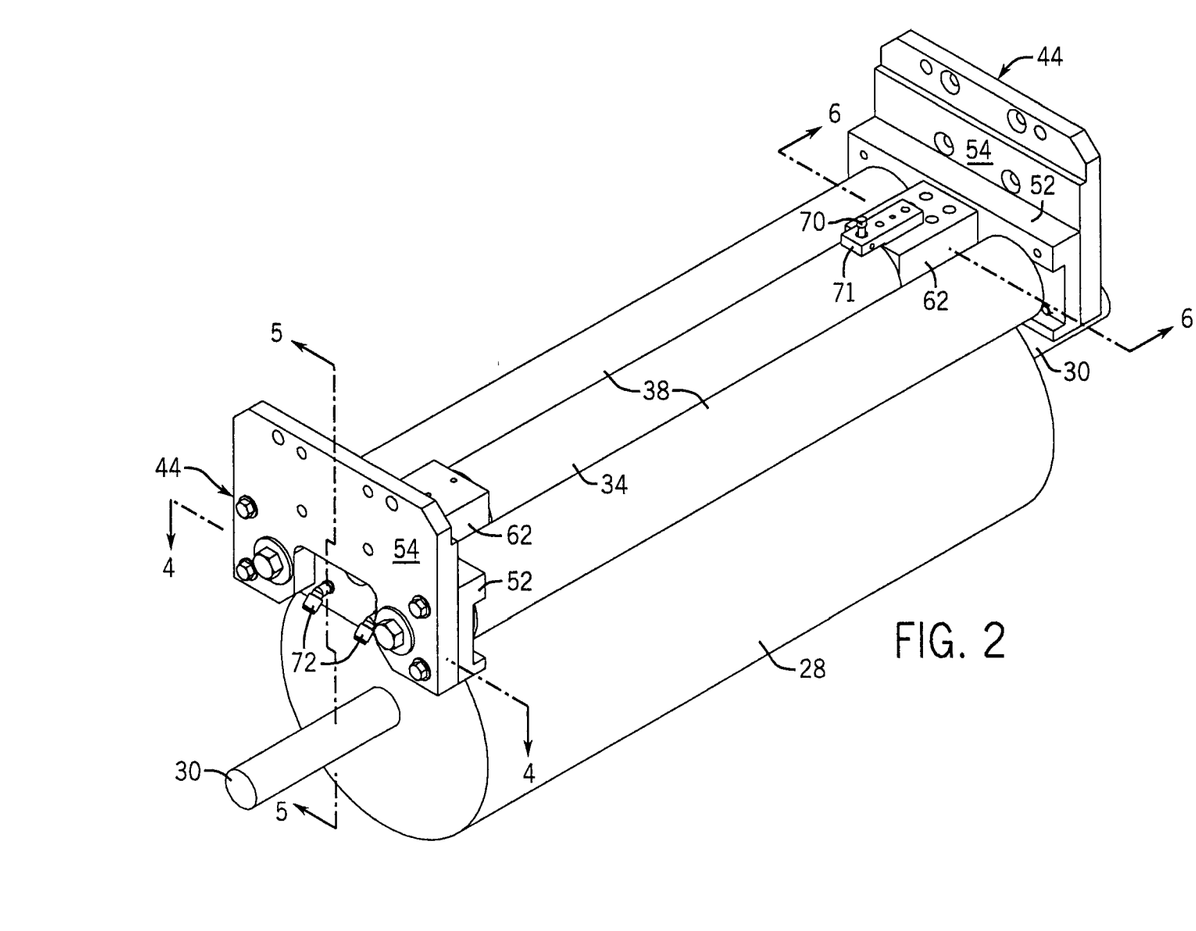
FIG. 2 is an enlarged perspective view of the electrode and roller assembly thereof.
Figure 3:
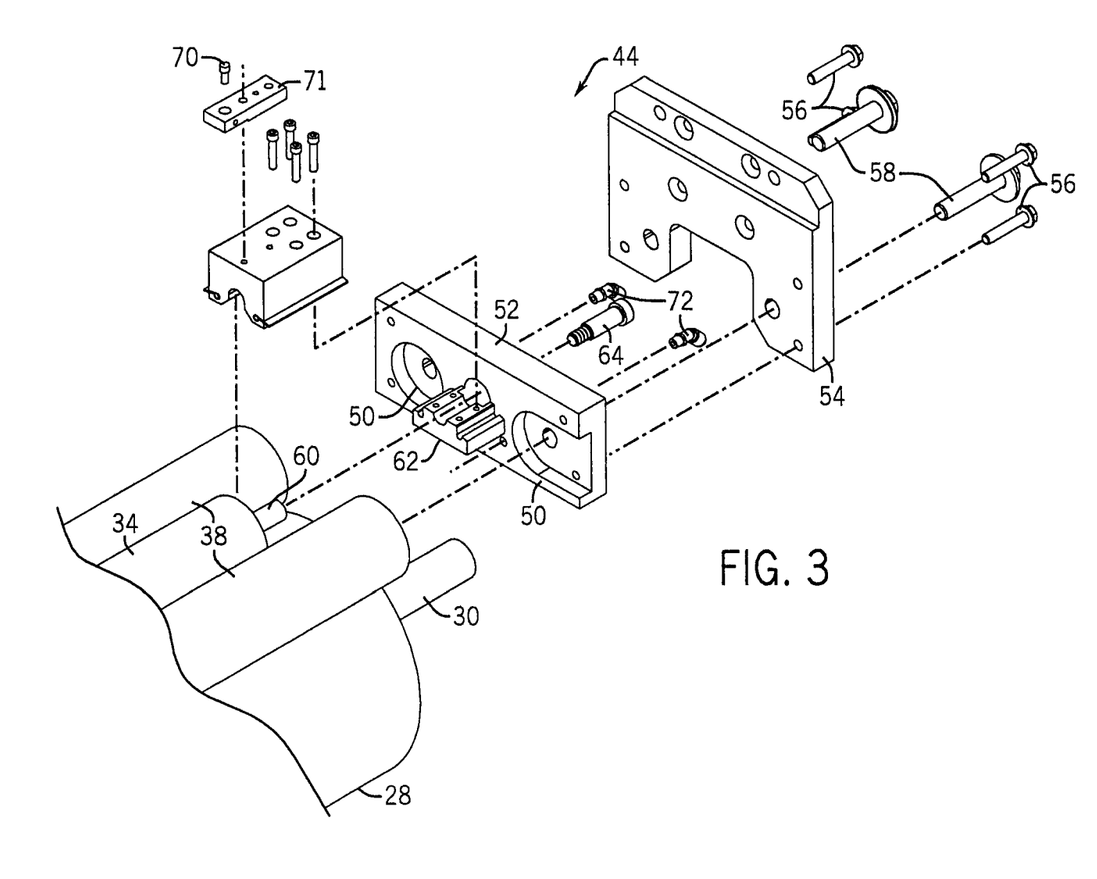
FIG. 3 is an enlarged partial exploded assembly view of an end mounting assembly thereof.
Figure 4:
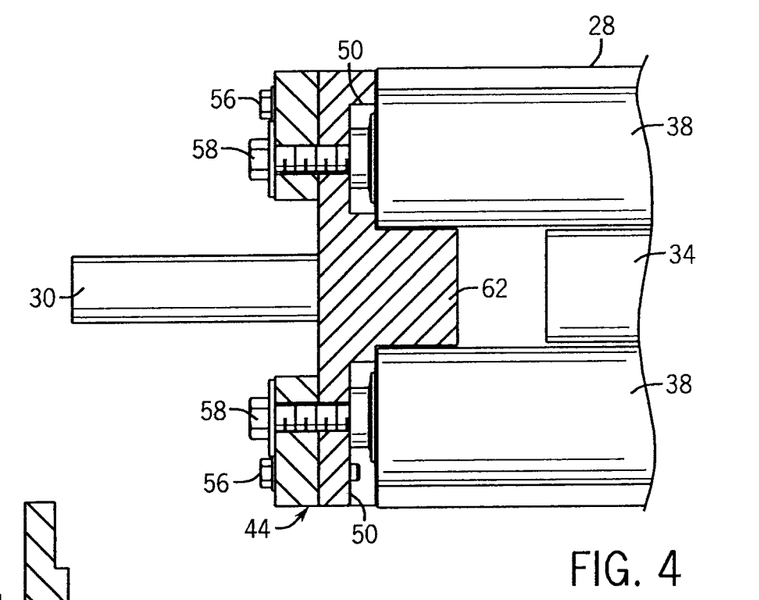
FIG. 4 is a partial sectional view thereof taken along line 4-4 of FIG. 2.
Figure 5:
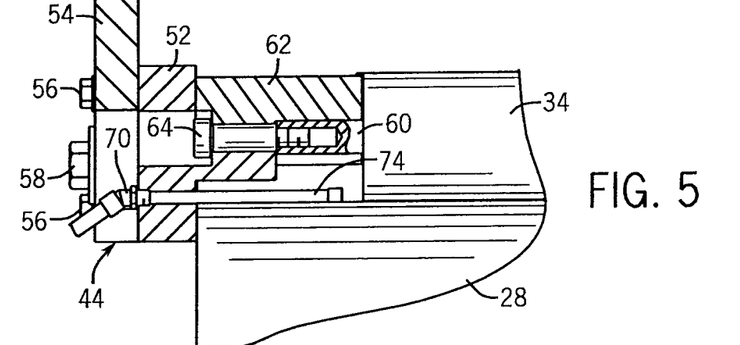
FIG. 5 is a partial sectional view thereof taken along line 5-5 of FIG. 2.

Two nip rollers 38 disposed on opposite feed and exit sides (respective right and left sides in FIG. 7) of the roller electrode 34 are each aligned in parallel, and in essentially tangential contact with the roller electrode 34. When the web material is not present and the roller electrode 34 is in operating position, the nip rollers 38 also make tangential contact with the backing roller 28. The nip rollers 38 are generally the same length (which corresponds to the width dimension of the web material) as the backing roll 28, all of which are longer than the roller electrode 34 (as shown in FIGS. 1 and 2). Shortening the roller electrode 34 in this way helps prevent arcing to the backing roll 28 at the ends. The nip rollers 38 can have a conductive or non-conductive cylinder body covered along its length by a non-conductive, compliant material 42, such a suitable high temperature rubber material, for example silicone rubber. The compliant material can be coupled to the cylinder body of the nip rollers 38 in any suitable manner, such as by a coating process or mechanical attachment of a sleeve form of the material. The compliant material 42 assists in creating a rolling line or surface seal with the roller electrode 34 and also with either the web material, or the backing roll 28 when the web material is not present. The compliant material 42 also increases the friction at the interface with the web material so that the nip rollers 38 can be used to feed the web material through the treater 20 if driven under power, as known in the art. Separate feed and take-up rollers (not shown) can be used to drive the web material through the treater 20 as the nip rollers 38 freely rotate. Alternatively, one or both of the nip rollers 38 can be drive rollers, driven by a motor or other powered arrangement as known in the art, such that separate rollers are not needed.

As shown in FIGS. 2-6, the roller electrode 34 and the nip rollers 38 are assembled to end mounts 44, which serve to mount this assembly to the treater station 20 as well as facilitate introduction of process gas while skirting the ends to confine the process gas during operation. The end mount components are preferably made of a heat resistant, non-corrosive and non-conducting material, such as a suitable fiberglass laminate or ceramic.

More specifically, the ends of the nip rollers 38 are each fit into recesses 50 in a mounting plate 52, which in turn mounts to a larger mounting bracket 54 via bolts 56. One of the recesses 50 is open-sided to facilitate dismounting the feed side nip roller 38 and access to the roller electrode 34 for setting the electrode gapping and other purposes. Both recesses have a through opening for a mounting bolt 58 that threads into a corresponding holes in the shaft ends of each nip roller 38. The bolts 58 fit through corresponding holes in the associated mounting bracket 54. The roller electrode 34 has spindles 60 that fit into the cylindrical openings of mounting blocks 62 extending inwardly from the center of the mounting plates 52. A bolt 64 threads into an opening in each spindle 60 to secure the roller electrode 34. One of the leads (not shown) of the power supply couples to a carbon brush 70 and in turn to the outer surface of the roller electrode 34. The brush 70 is mounted to the associated mounting block 62 via bracket 71. The mounting blocks 62 are sized to extend down far enough to overlap and skirt a portion of the top of the backing roll 28. And the mounting blocks 62 mount Teflon wipers 73 that seal against the nip rollers 38, as shown in FIG. 6. The mounting bracket 54 mounts inlet and outlet fittings 72 for injecting and returning process gas alongside the roller electrode 34. One or both of the mounting blocks 62 allows space for an inlet injector nozzle 74 to extend close to the cylindrical body of the roller electrode 34. Flexible lines connect the fittings between one or more gas tanks and/or pumps (not shown), when the treater is run in chemical corona and plasma modes.

This entire assembly is mounted to the upright supports 24 via a pair of actuators 80, such as hydraulic or pneumatic cylinders, in which the cylinder bodies 82 are bolted to the upright supports 24 and the end mounts 44 are bolted to the movable arm 84. This provides a vertically adjustable carriage with the roller electrode 34 and nip rollers 38, which is movable with respect to the backing roll 28 for loading the web material into the treater 20 and for setting a desired gap distance between the roller electrode 34 and the backing roll 28, which for example may range between 0.04 and 0.06 inches for some common applications. The vertical adjustment also accommodates different material thickness by varying the gap between the roller electrode 34 and backing roll 28, while maintain a constant spacing between the roller electrode 34 and the treated surface of the web material. The actuators 80 can be electronically controlled via a suitable control (not shown).

When the carriage is lowered into operational position, such as depicted in FIGS. 1, 6 and 7, a discharge chamber 90 is formed between the backing roll 28 at the bottom, the roller electrode 34 at the top and the nip rollers 38 at the feed and exit sides. More specifically, the discharge chamber 90 is the space between the curvature of the rolls, extending to the tangential contact lines of the engaging rolls, where rolling sealing engagement is made. The electrode assembly, namely the roller electrode 34 and backing roll 28, combine with two the nip rollers 38 to define the space where discharge occurs. These components also confine the discharge chamber 90 at the feed and exit sides, and cooperate with the mounting plates 52 to confine the discharge chamber from all sides. Note that, as shown in FIG. 7, the roller electrode 34 is offset slightly from the arc on which the nip rollers 38 are disposed to maintain the small gap distance from the web material, which is maintained regardless of web thickness by virtue of the vertically adjustable carriage. Also note that as it rotates the entire cylindrical surface area of the rolling electrode 34 is used to effect discharge, however, only the part of the surface that is within the discharge chamber nearest the backing roll 28 constitutes the discharge surface of the roller electrode 34 at any point in time. Assuming that the material feed direction is from right to left in FIG. 7, the feed side nip roller will rotate in a clockwise direction and the backing roll 28 will rotate in the opposite (counter-clockwise) direction to feed the web material through the discharge chamber 90. By virtue of its rolling engagement with the feed side nip roller, the roller electrode will also rotate counter-clockwise while engaging the exit side nip roller, which turns clockwise.

Confining the discharge chamber 90 in close proximity to the discharge process greatly simplifies the sealing arrangement, thereby avoiding the complex staging and other remote isolating arrangements of prior treaters. It also allows for more consistent and homogenous treatment by better ensuring that the precise area where the discharge occurs is at ideal conditions with less inadvertent loss of the process gas. Ambient air surrounding the treater is also essentially prevented from entering into the discharge chamber 90, which could otherwise displace the process gas and/or introduce airborne contaminants into the discharge chamber, which can dilute the process gas being ionized and lead to plasma streamers or other discharge anomalies. Sealing the feed side of the discharge chamber 90 prevents the boundary layer of air at the surface of the web material, which is typically in a laminar state, from entering the discharge chamber 90 as the material is fed into the treater 20. This also allows for higher line speeds, greater throughput and significantly less consumption, on the order of at least 50%, when using a gas chemistry. For example, a treater 20 according to the present invention having a 20 inch treatment width will consume approximately 2 liters of process gas per minute irrespective of line speed. Moreover, the treater of the present invention can be used to process web materials at high line speeds of 1000 ft/min or more, without appreciable degradation in treatment quality.

Since the discharge chamber 90 remains in communication with the ambient environment, by virtue of the end mounts 44 blocking, but not entirely closing off, the lateral ends of the discharge chamber 90, the discharge chamber 90 is confined, rather than completely isolated. This provides the additional advantage of achieving high quality corona, chemical corona and plasma treatments at atmospheric pressure without the need for the enclosure, sealing means and transfer lines needed for systems requiring that a vacuum be maintained in the discharge chamber. It also permits plasma treatment using high operating frequencies at atmospheric pressure without the risk of ionizing the ambient air rather than the process gas, which could effect a corona, rather than a plasma. This allows for easier and quicker feeding of the material and less maintenance by reducing the turns required by the material and permitting a more direct feed path. All of this can be achieved with the present invention without sacrificing high line speeds and low consumption of the process gas.

This also allows for atmospheric corona and plasma treatment of the web material without any significant net ozone being produced outside of the discharge chamber 90. That is, essentially no ozone is detectable beyond the discharge chamber 90, even though it is open to the ambient environment. By "no ozone" it is meant that no significant level of ozone is exhausted from the discharge chamber to the nearby ambient air surrounding the treater 20. More specifically, the present invention provides less than 0.1 parts per million of ozone exhaust within about one meter of the discharge chamber, and in some cases has been measured to be at or below 0.01 ppm. It is believed that at one meter the level of ozone would be virtually undetectable by conventional equipment. When performing corona treatment according to the present invention, the ozone generated during the ionization of air within the discharge chamber 90 is largely, or possibly entirely, disassociated (or broken down) by thermal energy back into oxygen as a result of confining the discharge chamber 90. The discharge chamber 90 realizes elevated temperatures at or above 340° F., which is the disassociation temperature of oxygen atoms, and thus when subjected to such sustained temperatures causes the accelerated conversion of ozone into oxygen. Thus, the ozone generated by the corona is not allowed to freely dissipate into the air surrounding the treater 20, but instead is confined within the discharge chamber 90, which again is confined, but not entirely sealed off.

The present invention thus not only provides corona treatment, which is a less costly and more readily available form of discharge treatment, but an improved quality corona treatment for which there is no need for forced air ozone exhaust and decomposition systems, which are expensive, complicated assemblies that could otherwise disrupt conditions in the discharge chamber 90.

Figure 8:
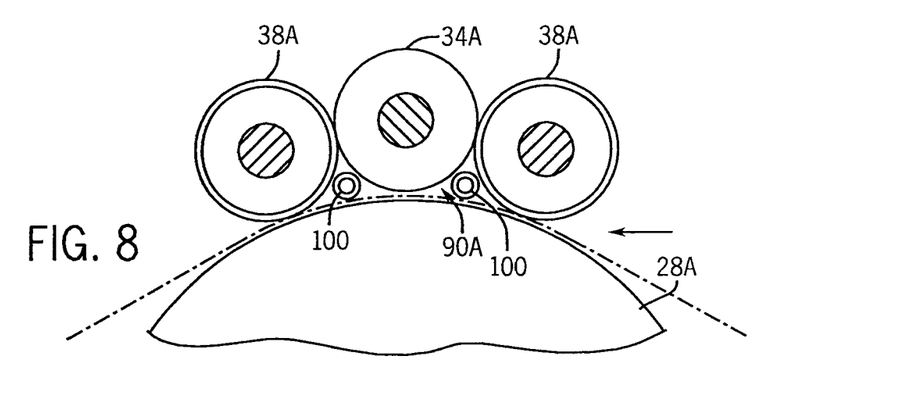
FIG. 8 is a simplified partial sectional view similar to FIG. 7 albeit of a second embodiment of the present invention having elongated diffusers for distributing process gas.

Referring now to FIG. 8, an alternate embodiment of the invention has a discharge chamber 90A formed in the same manner as described above, namely by a backing roll 28A below a roller electrode 34A disposed between two nip rollers 38A, which are in tangential, rolling sealing engagement with the backing roll 28A (or web material) and roller electrode 34A and are skirted at the lateral ends. However, here there are two diffusers 100 mounted between the end mounts (not shown) that disperse the process gas within the discharge chamber 90A uniformly along the length of the roller electrode 34A. The diffusers 100 can be any high temperature, and preferably ozone resistant material, with discrete opening or one or more porous sides, such as a porous ceramic having an average porosity measurable on the micron scale. The diffusers 100 are shown as having the same circular cross-sections, however, non-circular cross-sections of the same or varying size could be used. For example, it may be beneficial to use a larger diffuser at the feed side of the roller electrode 34 compared to the exit side, since the process gas may be forced toward the exit side by movement of the web material. The diffusers make the embodiment especially suited for chemical corona or plasma treatment given the enhanced dispersion of the process gas, however, this embodiment is of similar construction and affords the benefits discussed above with regard to the first embodiment.

Figure 9:
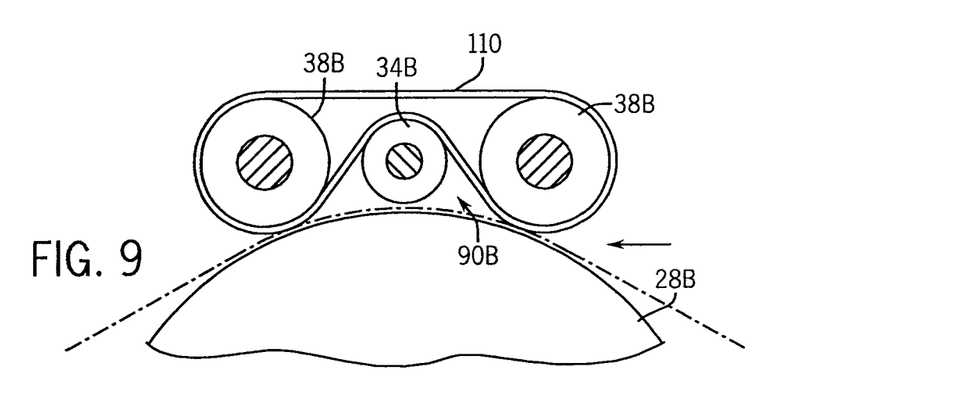
FIG. 9 is a simplified partial sectional view similar to FIG. 7 albeit of a third embodiment of the present invention having a flexible member, such as a belt, to confine the discharge chamber.
Figure 10:
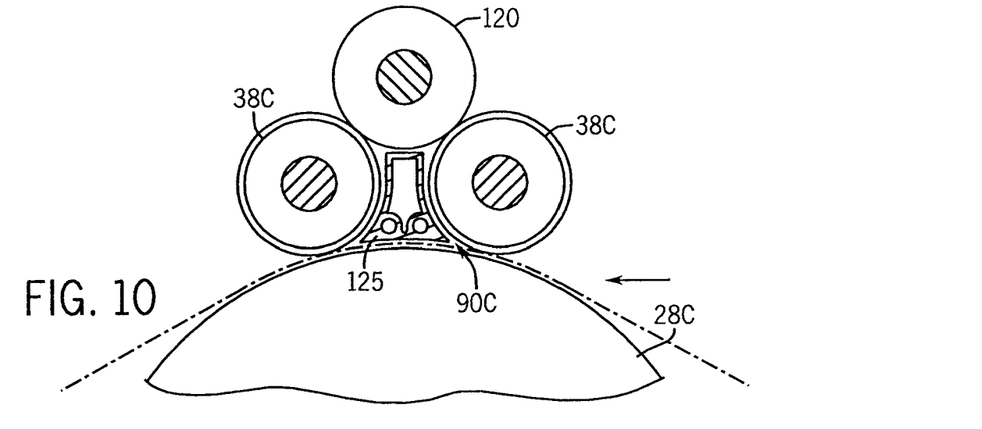
FIG. 10 is a simplified partial sectional view similar to FIG. 7 albeit of a fourth embodiment of the present invention having a stationary electrode within the discharge chamber.
Figure 11:
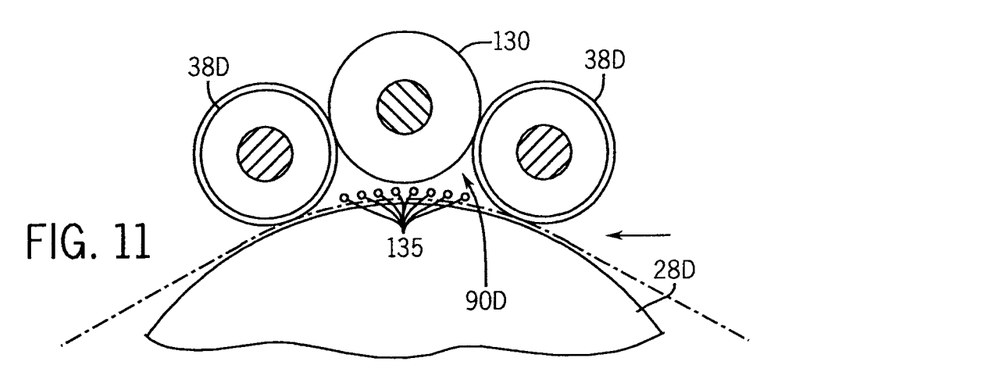
FIG. 11 is a simplified partial sectional view similar to FIG. 10 albeit of a fifth embodiment of the present invention having one or more narrow, wire-like electrodes in the discharge chamber.

Referring now to FIG. 9, another alternate embodiment of the invention has a discharge chamber 90B formed between the space defined by a flexible membrane or belt 110 wrapped around a pair of nip rollers 38B and a roller electrode 34B and contacting tangential surfaces of a backing roll 28B (or web if present). In the illustrated embodiment, the belt 110 wraps around the nip rollers 38B and remains in contact with approximately 240° of the outer diameter of each, and wraps only over approximately the top 120° of the roller electrode 34B, as it travels during operation. The belt 110 is preferably a high temperature, ozone resistant compliant material, such as silicone, Teflon or like materials and can be reinforced with non-conductive materials, such as glass fiber. For better confinement at the lateral ends, modified end mounts (not shown) could be used that have recesses in the mounting plates that generally outline the belt configuration. This embodiment is otherwise of similar construction as, and affords the benefits discussed above with regard to, the first embodiment.

Figure 14:
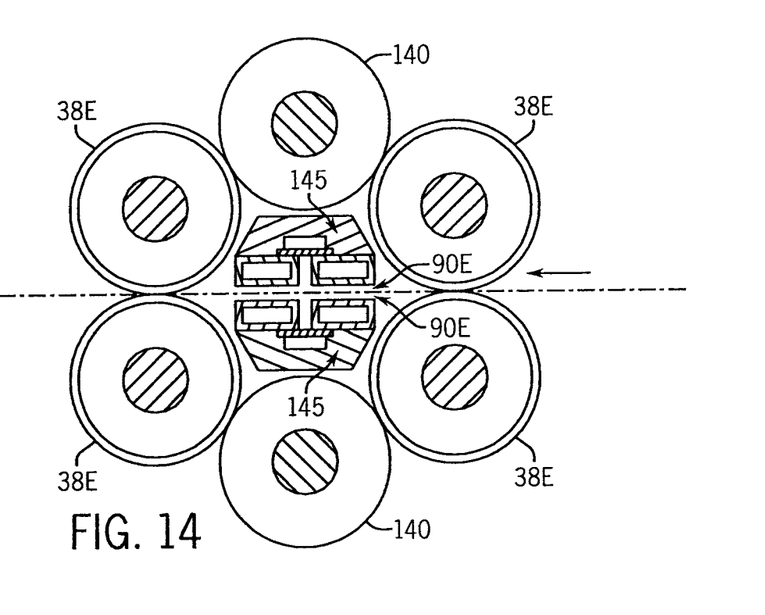
FIG. 14 is a simplified partial sectional view similar to FIG. 13 albeit of an eighth embodiment of the present invention having two opposed stationary tangential electrode assemblies and two roller assemblies forming two discharge chambers where opposite sides of the material can be treated simultaneously.

All of the additional embodiments depicted in FIGS. 10, 11, 13 and 14 illustrate how the present invention can be used with stationary active electrodes, with (FIGS. 10 and 11) or without (FIGS. 13 and 14) a backing roll. Specifically, the embodiments of FIGS. 10 and 11 create respective discharge chambers 90C and 90D between backing rolls 28C and 28D and two compliant coated nip rollers 38C and 38D, one non-conductive, non-compliant idler rollers 120 and 130, which surround stationary active electrodes 125 and 135, respectively. In each case, the nip rollers are in rolling sealing engagement with the backing roll (or web material if present) and the associated idler roller to confine the discharge chamber. The active electrode 125 is a conventional tubular electrode having internal porting for coupling both coolant and process gas lines within the interior of the electrode. The active electrode 135 is an array of wires or thin bars mounted between the end mounts. The embodiment of FIG. 13 uses a similar roller arrangement, including two compliant nip rollers 38E and a non-conductive, non-compliant idler roller 140 to define the discharge chamber 90E in which the electrode 145 is disposed. However, here there is no backing roll or ground potential of any kind needed because the electrode 145 is an assembly of at least two electrodes 147 and 149 at different potentials. The electrode assembly 145 is of known type, for example, as disclosed in U.S. Pat. No. 6,429,595. Although one is not needed, a backing roll or other flat support could be used to support the web material, provided it is non-conductive. Note that the depicted electrode assembly 145 has an internal gas chamber and diffuser 148, and is thus particularly suited for chemical corona or plasma treatment. The embodiment of FIG. 14 is effectively two of the FIG. 13 assemblies arranged in opposition to one another so that are two discharge chambers 90E at two (opposite) sides of the web material, which can be treated simultaneously. This embodiment provides a good example of how utilizing the present invention without a backing roll can provide significant treatment benefits, particularly in treating continuous web materials. As with other embodiments, modifications can be made to the end mounts of these embodiments regarding the mounting of the electrodes and/or rollers and confining the discharge chambers, however, the aforementioned benefits apply to these embodiments in a similar manner.

Figure 12:
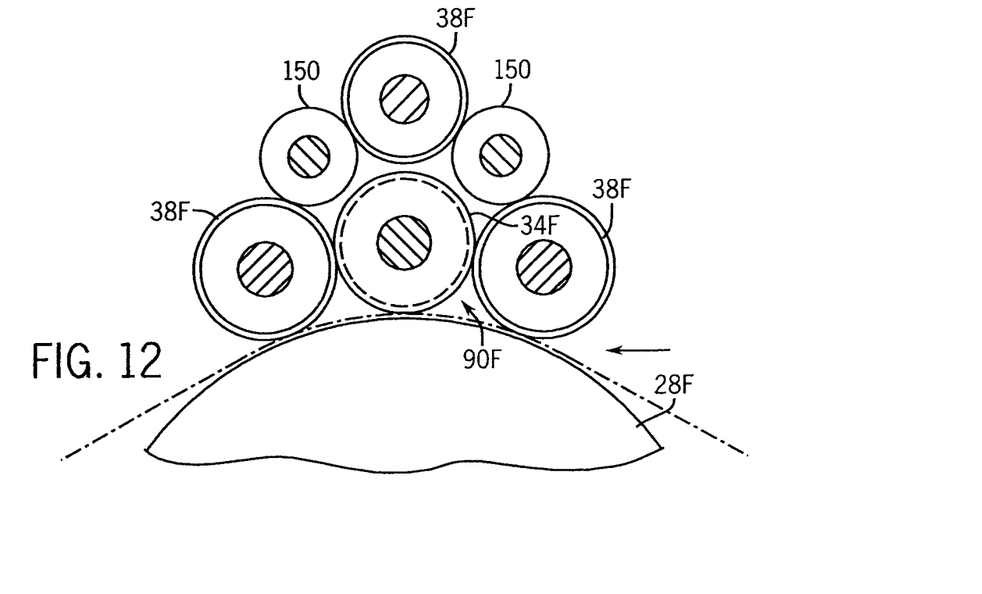
FIG. 12 is a simplified partial sectional view similar to FIG. 7 albeit of a sixth embodiment of the present invention having a porous roller electrode.
Figure 13:
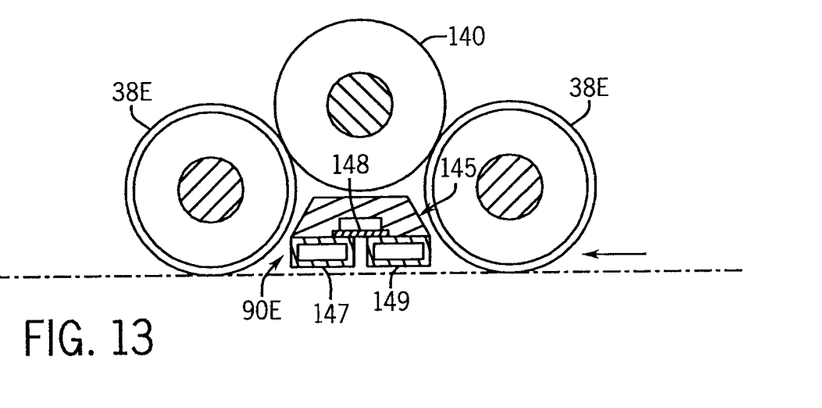
FIG. 13 is a simplified partial sectional view similar to FIG. 10 albeit of a seventh embodiment of the present invention having a stationary electrode assembly in the discharge chamber without a ground roller electrode.

The embodiment shown in FIG. 12 illustrates that the principles of the present invention can be applied while using a porous roller electrode 34F, such as made of a porous metal, having porosity similar to the diffusers mentioned above. In this case, the process gas can be directed under pressure from the supply system into and through the wall of the porous electrode 34F so as to better disperse the process gas through the discharge chamber 90F without the need for a separate nozzle or diffuser. Here, the roller assembly includes the two nip rollers 38F with compliant outer layers, as discussed above, as well as a third compliant covered nip roller and two non-conductive, non-compliant idler rollers 150 each disposed between and creating a rolling seal with two of the nip rollers. Thus, this five roller arrangement, along with the backing roll 28F, confines the discharge chamber 90F and the space above the porous roller electrode. Note that the third (top center) nip roller does not engage the roller electrode because of its opposite rotational direction. Larger end mounts with more mounting locations and more blocking area to accommodate the additional roll would be utilized for this embodiment, however, this embodiment is of similar construction and affords the benefits discussed above with regard to the first embodiment.

Many other variations to one or more of the aforementioned embodiments are envisioned within the scope of the present invention. For example, water or air cooling systems can be incorporated into the treater station. Since the discharge chambers are confined, the present invention makes possible the use of external air cooling of the roller electrodes in the embodiments of FIGS. 7 and 8, for example via an air knife, without disrupting the process gas or the discharge. Internal air and water cooling is possible in the embodiments of FIGS. 7-10 and 13-14 via compressed air or water lines being coupled to internal passageways in the active electrodes, such as shown in the FIG. 10 embodiment.

The treaters of the present invention could also include strip insulators (not shown) mounted to the end mounts, for example in a snap connection, that extend across the web material and facilitate lane treating of the material by blocking the discharge from reaching the portion of material beneath the insulators, as know in the art. Also, using thick compliant material, such as ¼ to ½ inches thick, or highly compliant material, such as having a 30-50 Shore A durometer, could help encapsulate stock materials of lesser width than the roller electrode, and thereby better confine the process gas in such cases.

Various aspects of the present invention could also be employed for treaters where a positive pressure or vacuum is achieved in the discharge chamber. Moreover, other roller arrangements of various dimensions and quantities can be used. Furthermore, a flat support or ground could be substituted for the backing roll in the embodiments having a roller electrode.

Thus, it can be appreciated that many variations are possible from the preferred embodiments described above without departing from the spirit of the invention. Reference should therefore be made to the claims for interpreting the entire scope of the invention.

We claim:
1. A surface treater, comprising:
a backing roll in rolling contact with a material passing through the treater;
an active roller electrode having a discharge surface disposed opposite to and spaced from the backing roll and maintaining a small gap distance from the material;
first and second nip rollers, the first and second nip rollers being in rolling contact with the material and in rolling sealing engagement with the roller electrode at opposite sides of the treater to define a discharge chamber between the backing roll, the roller electrode and the first and second nip rollers in which the discharge surface of the roller electrode is disposed and the material passes; and
a power supply operatively connected to the roller electrode to ionize a process gas and produce a discharge within the discharge chamber.

2. The treater of claim 1, wherein the first and second nip rollers are at respective feed and exit sides of the treater in the direction of travel of the material so as to confine the discharge chamber at the feed and exit sides of the treater.

3. The treater of claim 2, wherein at least one of the roller electrode and the backing roll has a dielectric outer layer.

4. The treater of claim 2, wherein the feed and exit nip rollers each have a compliant outer surface.

5. The treater of claim 2, wherein a belt seal is disposed about the feed and exit nip rollers and the roller electrode.

6. The treater of claim 2, wherein the roller electrode is porous and process gas passes within an interior of the roller electrode and through a porous wall of the roller electrode into the discharge chamber.

7. The treater of claim 6, further including one or more additional rollers forming the discharge chamber.

8. The treater of claim 2, further including at least one diffuser for dispersing the process gas within the discharge chamber along the length of the roller electrode.

9. The treater of claim 1, wherein the roller electrode has an internal passageway for coolant.

10. The treater of claim 2, wherein the roller electrode and the feed and exit nip rollers are adjustably mounted with respect to the backing roll.

11. The treater of claim 1, further including non-conductive end mounts mounting the roller electrode and the first and second nip rollers and confining the discharge chamber at opposite ends thereof.

12. The treater of claim 11, wherein at least one of the end mounts mounts an inlet nozzle for injecting the process gas into the discharge chamber.

13. The treater of claim 1, wherein the discharge chamber is open to ambient air at a lateral side.

14. A continuous feed discharge treater, comprising:
a backing roll supporting a material passing through the treater;
a roller electrode disposed to a side of the web material opposite the backing roll;
a feed side nip roller having a non-conductive body disposed at the feed side of the treater in rolling sealing engagement with the roller electrode and the web material;
an exit side nip roller having a non-conductive body disposed at the exit side of the treater in rolling sealing engagement with the roller electrode and the web material; and
a power supply having a high voltage lead operatively connected to the roller electrode and a ground lead operatively connected to the backing roll;
wherein at least one of the backing roll and the roller electrode has a dielectric outer surface and wherein energization of the roller electrode effects a discharge between the roller electrode and the backing roll to ionize a process gas within a discharge chamber defined by the backing roll, the roller electrode and the nip rollers through which the web material passes.

15. A corona treater, comprising:
a backing roll for supporting material being treated;
an active roller electrode having a discharge surface spaced from the backing roll;
at least two nip rollers in rolling sealing engagement with the roller electrode at opposite feed and exit sides of the treater to define a discharge chamber between the material being treated and the at least two nip rollers in which the discharge surface of the roller electrode is disposed;
non-conductive end mounts mounting the roller electrode and the at least two nip rollers and confining the discharge chamber at opposite ends thereof; and
a power supply operatively connected to the roller electrode to produce a discharge
that ionizes a process gas within the discharge chamber.

16. A roller assembly for a discharge treater station used to treat a surface of a material by ionizing a process gas and producing an electrical discharge to which the material surface is subjected, the roller assembly comprising:
 a roller electrode having a conductive discharge surface in spaced relation to the material;
 a first nip roller having a non-conductive body with a compliant outer surface in rolling sealing engagement with the roller electrode; and
 a second nip roller having a non-conductive body with a compliant outer surface in rolling sealing engagement with the roller electrode;
 wherein when installed in the treater station, the roller electrode and the first and second nip rollers cooperate with the material to define a discharge chamber therebetween in which the discharge is produced and to seal off the ionized process gas with the discharge chamber at feed and exit sides thereof.

* * * * *

UNITED STATES PATENT AND TRADEMARK OFFICE
CERTIFICATE OF CORRECTION

PATENT NO. : 8,709,351 B2  
APPLICATION NO. : 12/255847  
DATED : April 29, 2014  
INVENTOR(S) : Richard R. Hammen et al.

Page 1 of 1

It is certified that error appears in the above-identified patent and that said Letters Patent is hereby corrected as shown below:

On the title page item (73):

"Enercon Industris Corporation" should be --Enercon Industries Corporation--

Signed and Sealed this
Nineteenth Day of August, 2014

Michelle K. Lee
*Deputy Director of the United States Patent and Trademark Office*